US012659364B2

(12) United States Patent (10) Patent No.: US 12,659,364 B2
Grzesiak et al. (45) Date of Patent: Jun. 16, 2026

(54) METHOD AND APPARATUS FOR REDUCING LATENCY OF STREAMING SERVICE BY NETWORK SLICES PARALLEL IN WIRELESS COMMUNICATION SYSTEM

(71) Applicant: Samsung Electronics Co., Ltd., Suwon-si (KR)

(72) Inventors: Grzegorz Pawel Grzesiak, Warsaw (PL); Jan Kienig, Warsaw (PL); Przemysław Wyszkowski, Warsaw (PL); Adam Kmieć, Warsaw (PL); Rafał Kuc, Warsaw (PL); Myungjoo Ham, Suwon-si (KR); Paweł Wąsowski, Warsaw (PL)

(73) Assignee: Samsung Electronics Co., Ltd., Suwon-si (KR)

( * ) Notice: Subject to any disclaimer, the term of this patent is extended or adjusted under 35 U.S.C. 154(b) by 424 days.

(21) Appl. No.: 18/333,042

(22) Filed: Jun. 12, 2023

(65) Prior Publication Data
US 2023/0336605 A1 Oct. 19, 2023

Related U.S. Application Data

(63) Continuation of application No. PCT/KR2023/004471, filed on Apr. 3, 2023.

(30) Foreign Application Priority Data

Apr. 4, 2022 (KR) ........................ 10-2022-0041722

(51) Int. Cl.
*H04L 65/75* (2022.01)
*H04W 72/23* (2023.01)
*H04W 76/10* (2018.01)

(52) U.S. Cl.
CPC ............. *H04L 65/75* (2022.05); *H04W 72/23* (2023.01); *H04W 76/10* (2018.02)

(58) Field of Classification Search
CPC ..... H04L 65/75; H04L 65/1095; H04L 65/61; H04L 65/80; H04W 72/23; H04W 76/10; H04W 48/18; H04W 4/60
See application file for complete search history.

(56) References Cited

U.S. PATENT DOCUMENTS 9,700,789 B2 7/2017 Cotter
9,770,657 B2 9/2017 Perlman et al.
(Continued)

FOREIGN PATENT DOCUMENTS

CN 106686385 A 5/2017
KR 10-2019-0121297 A 10/2019
(Continued)

OTHER PUBLICATIONS

International Search Report dated Jul. 19, 2023, issued in International Application No. PCT/KR2023/004471.
(Continued)

*Primary Examiner* — Nizar N Sivji
(74) *Attorney, Agent, or Firm* — Jefferson IP Law, LLP

(57) ABSTRACT

The disclosure relates to the 5th generation (5G) or 6th generation (6G) communication system to support a high data transmission rate than before. A method of operating a streaming service client (SSC) node in a wireless communication system is provided. The method includes an operation of establishing a connection to a streaming service provider (SSP) via two types of services that are enhanced mobile broadband (eMBB) and ultra reliable low latency communication (URLLC), an operation of receiving first data from the SSP via the eMBB, and simultaneously receiving second data via the URLLC, wherein the second (Continued)

data is metadata of the first data, and operation of determining whether the first data is successfully received, and an operation of producing a data stream using the second data in a case in which the first data is not successfully received.

20 Claims, 13 Drawing Sheets

(56) References Cited

U.S. PATENT DOCUMENTS

| | | | |
|---|---|---|---|
| 10,076,711 | B2 | 9/2018 | Malenfant |
| 10,279,260 | B2 | 5/2019 | Benedetto |
| 10,369,465 | B2 | 8/2019 | Perlman et al. |
| 10,630,995 | B2 | 4/2020 | Wang et al. |
| 11,310,827 | B2 | 4/2022 | Bae et al. |
| 11,343,333 | B2 | 5/2022 | Wang |
| 2018/0103428 | A1 | 4/2018 | Jiang et al. |
| 2019/0215133 | A1 | 7/2019 | Pan et al. |
| 2019/0364302 | A1 | 11/2019 | Perlman et al. |
| 2019/0394758 | A1* | 12/2019 | Cheng ................... H04W 24/08 |
| 2020/0052864 | A1* | 2/2020 | Hosseinian ............. H04L 25/02 |
| 2020/0206609 | A1 | 7/2020 | van der Laan et al. |
| 2020/0206613 | A1 | 7/2020 | Perlman et al. |
| 2020/0206619 | A1 | 7/2020 | van der Laan et al. |
| 2020/0230505 | A1 | 7/2020 | van der Laan et al. |
| 2020/0289937 | A1 | 9/2020 | Osman |
| 2020/0413436 | A1* | 12/2020 | Bae ....................... H04W 72/23 |
| 2021/0105308 | A1 | 4/2021 | Bouazizi et al. |

FOREIGN PATENT DOCUMENTS

| | | |
|---|---|---|
| KR | 10-2020-0088476 A | 7/2020 |
| KR | 10-2020-0114707 A | 10/2020 |
| KR | 10-2021-0039446 | 4/2021 |
| WO | 2020/204401 A1 | 10/2020 |

OTHER PUBLICATIONS

5G NR Standardized QoS Identifier (5GQI) to QoS Characteristics Mapping, Jul. 25, 2019 https://www.techplayon.com/5g-nr-standardized-qos-identifier-5gqi-to-qos-characteristics-mapping/.

5G wireless access: an overview https://www.ericsson.com/en/reports-and-papers/white-papers/5g-wireless-access-an-overview.

Live streaming latency https://support.google.com/youtube/answer/7444635?hl=en#zippy=%2Cwhy-is-there-a-trade-off-between-latency-and-quality%2Cultra-low-latency%2Clow-latency%2Cnormal-latency.

Google Avoided a Critical Detail About Streaming During It's Stadia Livestream, Jun. 7, 2019 https://www.forbes.com/sites/kevinmurnane/2019/06/07/google-avoided-a-critical-detail-about-streaming-during-its-stadia-livestream/?sh=7d819f0b6cc1.

Minimum speed recommendations by video game type https://www.allconnect.com/blog/recommended-speeds-by-gaming-type.

5G-Usage-Scenarios-eMBB-MMTC-uRLLC https://www.researchgate.net/figure/5G-Usage-Scenarios-eMBB-MMTC-uRLLC_fig5_338149616.

User Equipment https://en.wikipedia.org/wiki/User_equipment.

Haijun Zhang et al., Network Slicing Based 5G and Future Mobile Networks: Mobility, Resource Management, and Challenges, arXiv:1704.07038v1 [cs.IT], Apr. 24, 2017.

Petar Popovski et al., 5G Wireless Network Slicing for eMBB, URLLC, and mMTC: A Communication-Theoretic View, IEEE Access, vol. 6, 2018.

Akshatha Nayak Manjeshwar et al., Enhanced UE slice availability and mobility through multi-connectivity in 5G multi-RAT networks, 2019 IEEE Conference on Network Function Virtualization and Software Defined Networks (NFV-SDN).

Wangbong Lee et al., How to Create a Network Slice?—A 5G Core Network Perspective, ICACT2019 Feb. 17-20, 2019.

DeepMind DVD-GAN: Impressive Step Toward Realistic Video Synthesis, Jul. 17, 2019 https://medium.com/syncedreview/deepmind-dvd-gan-impressive-step-toward-realistic-video-synthesis-12027d942e53.

Video Generation https://paperswithcode.com/task/video-generation/latest.

Sergey Tulyakov et al., MoCoGAN: Decomposing Motion and Content for Video Generation.

Sanam Malhotra, Upscaling Images With Machine Learning for Optimum Resolution, May 21, 2020 https://artificialintelligence.oodles.io/blogs/upscaling-images-with-machine-learning/.

Anupam Kumar Bairagi et al., Coexistence Mechanism between eMBB and uRLLC in 5G Wireless Networks, arXiv:2003.04551v1 [cs.NI], Mar. 10, 2020, IEEE Transactions on Communications.

Tengteng Ma et al., Slicing Resource Allocation for eMBB and URLLC in 5G Ran, Hindawi Wireless Communications and Mobile Computing vol. 2020, Article ID 6290375, 11 pages.

5G eMBB mMTC URLLC | difference between 5G eMBB mMTC URLLC https://www.rfwireless-world.com/Terminology/5G-eMBB-vs-mMTC-vs-URLLC.html.

S. Shalunov et al., A One-way Active Measurement Protocol (OWAMP), Network Working Group, Sep. 2006 https://datatracker.ietf.org/doc/html/rfc4656.

K. Hedayat et al., A Two-way Active Measurement Protocol (TWAMP), Network Working Group, Oct. 2008 https://datatracker.ietf.org/doc/html/rfc5357.

* cited by examiner

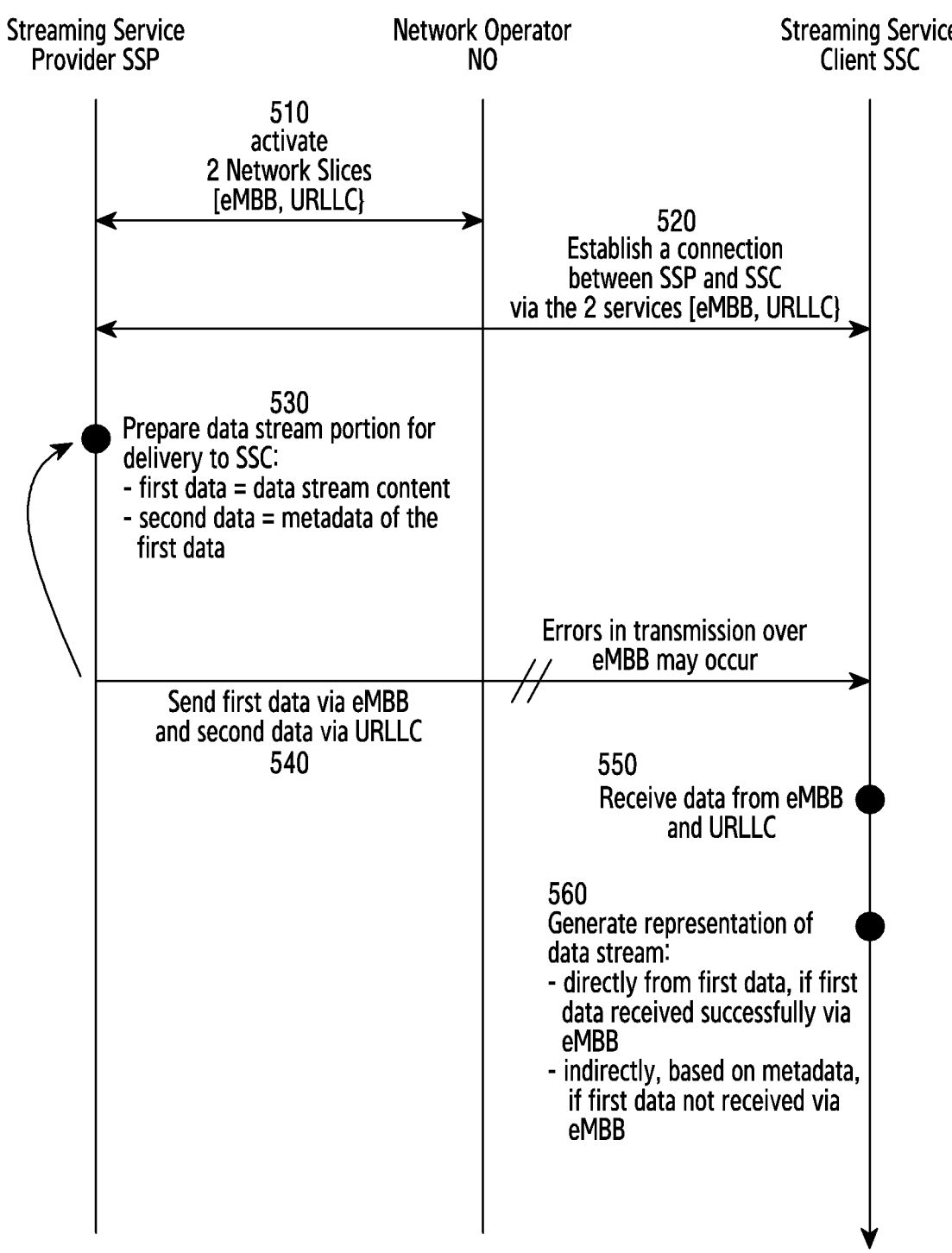

Streaming Service
Provider SSP

Network Operator
NO

Streaming Service
Client SSC 510
activate
2 Network Slices
[eMBB, URLLC}

520
Establish a connection
between SSP and SSC
via the 2 services [eMBB, URLLC}

530
Prepare data stream portion for
delivery to SSC:
- first data = data stream content
- second data = metadata of the
  first data Errors in transmission over
eMBB may occur Send first data via eMBB
and second data via URLLC
540

550
Receive data from eMBB
and URLLC

560
Generate representation of
data stream:
- directly from first data, if first
  data received successfully via
  eMBB
- indirectly, based on metadata,
  if first data not received via
  eMBB TECHNICAL EFFECT ACHIEVED: representation of the data
stream can be generated at SSC even if high-payload data
transmitted via the eMBB is not received in full-then,
representation is generated locally at SSC based on the low-
payload metadata received via the reliable URLLC

FIG.5

Streaming Service (SS) offering establishment in the 5G network
Option 2: Streaming Service Server (SSS) deployed as a part of the 5G Network
NOP offers Network Slices in the "Network Slice as a Service" mode

FIG.9 eMBB          URLLC          mMTC

METHOD AND APPARATUS FOR REDUCING LATENCY OF STREAMING SERVICE BY NETWORK SLICES PARALLEL IN WIRELESS COMMUNICATION SYSTEM

CROSS-REFERENCE TO RELATED APPLICATION(S)

This application is a continuation application, claiming priority under § 365(c), of an International Application No. PCT/KR2023/004471, filed on Apr. 3, 2023, which is based on and claims the benefit of a Korean patent application number 10-2022-0041722, filed on Apr. 4, 2022, in the Korean Intellectual Property Office, the disclosure of which is incorporated by reference herein in its entirety.

TECHNICAL FIELD

The disclosure relates to a wireless communication system. More particularly, the disclosure relates to a method and apparatus for reducing the latency of a streaming service via network slices that are parallel in a wireless communication system.

BACKGROUND ART

5th generation (5G) mobile communication technologies define broad frequency bands such that high transmission rates and new services are possible, and can be implemented not only in "Sub 6 gigahertz (GHz)" bands such as 3.5 GHz, but also in "Above 6 GHz" bands referred to as millimeter wave (mmWave) such as 28 GHz and 39 GHz. In addition, it has been considered to implement 6th generation (6G) mobile communication technologies (referred to as Beyond 5G systems) in terahertz bands (for example, 95 GHz to 3 terahertz (THz) bands) in order to accomplish transmission rates fifty times those of 5G mobile communication technologies and ultra-low latencies one-tenth of 5G.

In the initial state of 5G mobile communication technologies, in order to support services and to satisfy performance requirements in connection with enhanced Mobile Broadband, (eMBB), Ultra Reliable & Low Latency Communications (URLLC), and massive Machine-Type Communications (mMTC), there has been ongoing standardization regarding beamforming and massive multiple input multiple output (MIMO) for alleviating radio-wave path loss and increasing radio-wave transmission distances in mmWave, numerology (e.g., operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large-capacity data transmission and a polar code for highly reliable transmission of control information, L2 pre-processing, and network slicing for providing a dedicated network customized to a specific service.

Currently, there is ongoing discussion regarding improvement and performance enhancement of initial 5G mobile communication technologies in view of services to be supported by 5G mobile communication technologies, and there has been physical layer standardization regarding technologies such as vehicle to everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, NR user equipment (UE) Power Saving, Non-Terrestrial Network (NTN) which is UE-satellite direct communication for securing coverage in an area in which communication with terrestrial networks is impossible, and positioning.

Moreover, there has been ongoing standardization in wireless interface architecture/protocol fields regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random access channel (RACH) for NR). There also has been ongoing standardization in system architecture/service fields regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

If such 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR, VR, and the like (XR=AR+VR+MR), 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for securing coverage in terahertz bands of 6G mobile communication technologies, Full Dimensional MIMO (FD-MIMO), multi-antenna transmission technologies such as array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

DISCLOSURE

Technical Problem

Aspects of the disclosure are to address at least the above-mentioned problems and/or disadvantages and to provide at least the advantages described below. Accordingly, an aspect of the disclosure is to provide a method and apparatus for reducing the latency of a streaming service via network slices that are parallel in a wireless communication system.

Additional aspects will be set forth in part in the description which follows and, in part, will be apparent from the description, or may be learned by practice of the presented embodiments.

Technical Solution

In accordance with an aspect of the disclosure, a method of operating a streaming service client (SSC) node in a wireless communication system is provided. The method includes an establishing a connection to a streaming service provider (SSP) via two types of services that are enhanced mobile broadband (eMBB) and ultra reliable low latency communication (URLLC), receiving first data from the SSP via the eMBB, and simultaneously receiving second data via the URLLC, wherein the second data is metadata of the first data, determining whether the first data is successfully received, and in case that the first data is not successfully received, an operation of producing a data stream using the second data.

In accordance with another aspect of the disclosure, a streaming service client (SSC) node in a wireless communication system is provided. The SSC node includes a transceiver and at least one processor, wherein the at least one processor is configured to establish a connection to a streaming service provider (SSP) via two types of services that are enhanced mobile broadband (eMBB) and ultra reliable low latency (URLLC), to receive first data from the SSP via the eMBB, and simultaneously, to receive second data via the URLLC, wherein the second data is metadata of the first data, determining whether the first data is successfully received, and in case that the first data is not successfully received, to produce a data stream using the second data.

Advantageous Effects

Various embodiments of the disclosure can provide a method and apparatus for reducing the latency of a streaming service via network slices that are parallel in a wireless communication system.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIG. 5 is a signal flowchart between an SSP, an NO, and an SSC in a wireless communication system according to an embodiment of the disclosure;

FIG. 9 is a signal flowchart between an SSP and a NOP in a wireless communication system according to an embodiment of the disclosure;

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, various embodiments of the disclosure will be described based on an approach of hardware. However, various embodiments of the disclosure include a technology that uses both hardware and software, and thus the various embodiments of the disclosure may not exclude the perspective of software.

Figure 1:
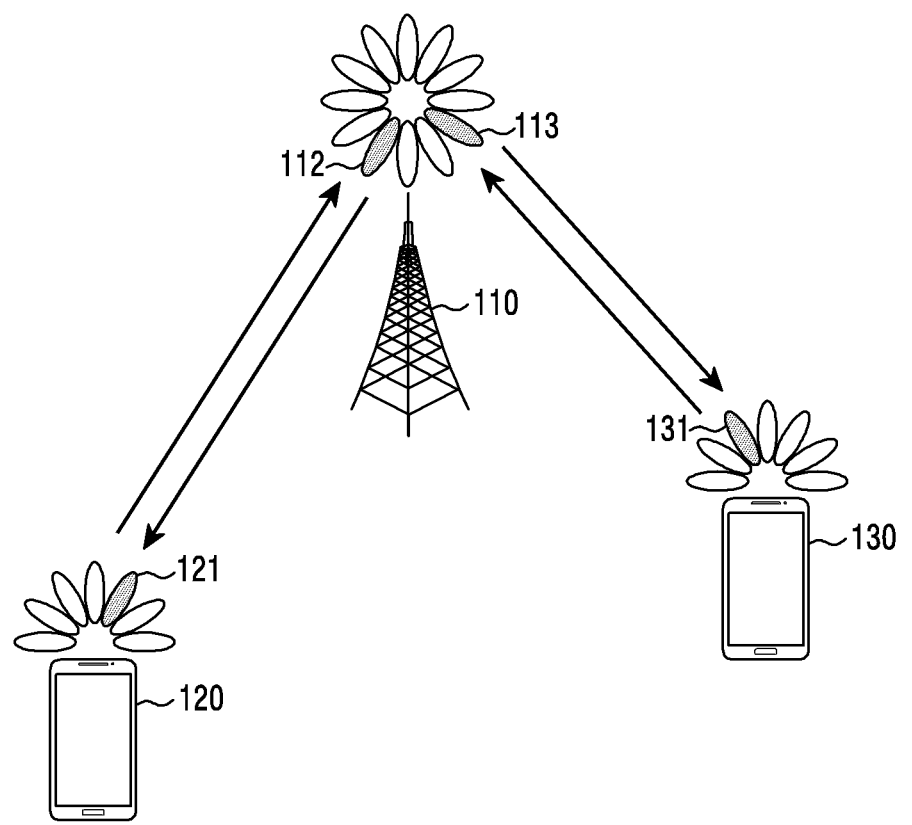
FIG. 1 is a diagram illustrating a wireless communication system according to an embodiment of the disclosure.

FIG. 1 is a diagram illustrating a wireless communication system according to an embodiment of the disclosure. FIG. 1 illustrates a base station 110, a terminal 120, and a terminal 130, as some of the nodes that use wireless channels in a wireless communication system. Although FIG. 1 illustrates a single base station, another base station which is the same as or similar to the base station 110 may be further included.

Referring to FIG. 1, the base station 110 may be a network infrastructure that provides wireless access to UEs 120 and 130. The base station 110 has a coverage area defined by a predetermined geographical area based on the distance in which the base station 110 is capable of delivering a signal. The base station 110 may be referred to as an access point (AP), an eNodeB (eNB), a 5th generation node (5G node), a next generation nodeB (gNB), a wireless point, a transmission/reception point (TRP), or other terms having the technical meaning equivalent thereto, in addition to a base station.

Each of the UEs 120 and 130 may be a device used by a user, and performs communication with the base station 110 via a wireless channel. Depending on the case, at least one of the UEs 120 and 130 may operate without manipulation by a user. At least one of the UEs 120 and 130 may be a device that performs machine type communication (MTC), and may not be carried by a user. Each of the UEs 120 and 130 may be referred to as a user equipment (UE), a mobile station, a subscriber station, a remote terminal, a wireless terminal, a user device, or other terms having meanings equivalent thereto, in addition to a terminal. The base station 110 may communicate with the UE 120 via antennas 121 and 112, and may communicate with the UE 130 via the antennas 131 and 113.

Figure 2:
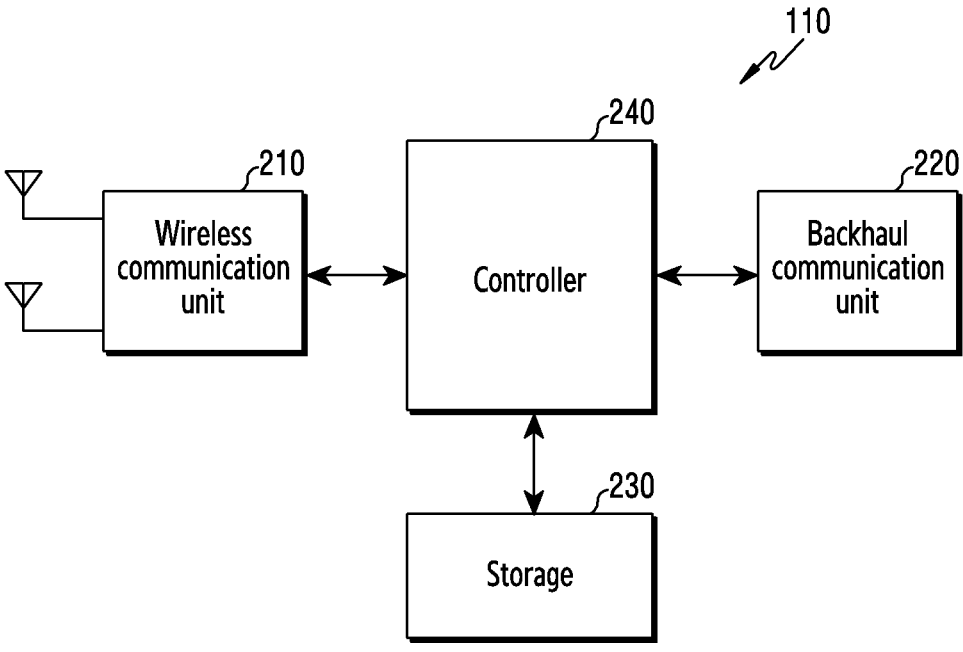
FIG. 2 is a block diagram illustrating the configuration of a base station in a wireless communication system according to an embodiment of the disclosure.

FIG. 2 is a block diagram illustrating the configuration of a base station in a wireless communication system according to an embodiment of the disclosure. The configuration of FIG. 2 may be understood as the configuration of the base station 110. The ending 'unit' or 'er' used hereinafter may refer to a unit for processing at least one function or operation, and may be implemented as hardware, software, or a combination of hardware and software.

Referring to FIG. 2, the base station includes a wireless communication unit 210, a backhaul communication unit 220, a storage 230, and a controller 240.

The wireless communication unit 210 transmits and receives signals. Accordingly, the entirety or a part of the wireless communication unit 210 may be referred to as a 'transmitter', 'receiver', or 'transceiver'. In addition, the transmission and reception performed via a wireless channel, which is described in the following descriptions, may be construed as an expression including that the above-described processing is performed by the wireless communication unit 210.

The backhaul communication unit 220 provides an interface for performing communication with other nodes in a network. The backhaul communication unit 220 converts a bit string transmitted from a base station to another node, for example, another access node, another base station, a higher node, a core network, or the like, into a physical signal, and converts a physical signal received from another node into a bit string.

The storage 230 stores data, such as a basic program for operating a base station, an application program, configuration information, and the like. The storage 230 may be embodied as a volatile memory, a non-volatile memory, or a combination of a volatile memory and a non-volatile memory. The storage 230 provides data stored therein in response to a request from the controller 240.

The controller 240 controls the overall operations of the base station. For example, the controller 240 transmits and receives signals via the wireless communication unit 210 or the backhaul communication unit 220. Further, the controller 240 records data in the storage 230 and reads data therefrom. In addition, controller 240 may perform the functions of a protocol stack that the communication standard requires. Depending on the implementation, the protocol stack may be included in the wireless communication unit 210. To this end, the controller 240 may include at least one processor.

Figure 3:
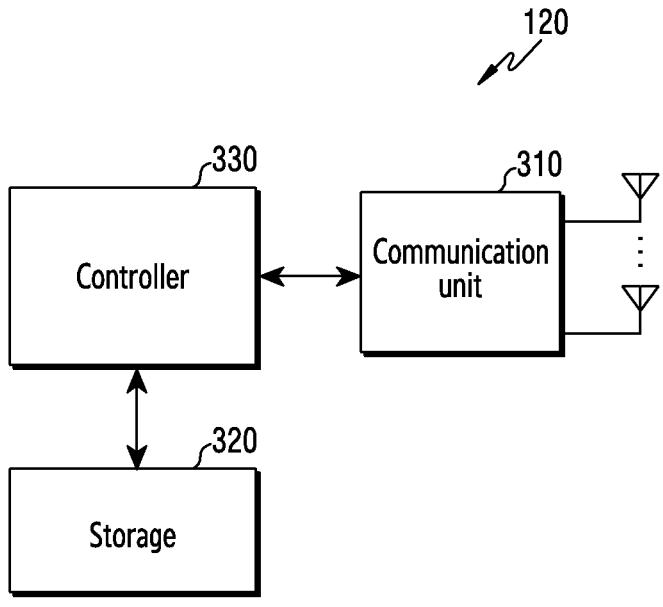
FIG. 3 is a block diagram illustrating the configuration of a user equipment (UE) in a wireless communication system according to an embodiment of the disclosure.

FIG. 3 is a block diagram illustrating the configuration of a user equipment (UE) in a wireless communication system according to an embodiment of the disclosure. The configuration illustrated in FIG. 3 may be understood as the configuration of the UE 120. The ending 'unit' or 'er' used hereinafter may refer to a unit by which at least one function or operation is performed, and may be implemented as hardware, software, or a combination of hardware and software.

Referring to FIG. 3, the UE includes a communication unit 310, a storage 320, and a controller 330.

The communication unit 310 transmits and receives signals. Accordingly, the entirety or a part of the communication unit 310 may be referred to as a 'transmitter', 'receiver' or 'transceiver'. In addition, transmission and reception performed via a wireless channel, which is described in the following descriptions, is construed as an expression including that the above-described processing is performed by the communication unit 310.

The storage 320 stores data, such as a basic program, an application program, configuration information, and the like for operating a UE. The storage 320 may be implemented as a volatile memory, a non-volatile memory, or a combination of a volatile memory and a non-volatile memory. The storage 320 provides data stored therein in response to a request from the controller 330.

The controller 330 controls the overall operations of a UE. For example, the controller 330 performs signal transmission and reception via the communication unit 310. Further, the controller 330 records data in the storage 320 and reads data therefrom. The controller 330 may perform the functions of a protocol stack that the communication standard requires. To this end, the controller 330 may include at least one processor or micro-processor, or may be a part of the processor. In addition, a part of the communication unit 310 and the controller 330 may be referred to as a communication processor (CP).

1. Background (Introduction)

1.1. Technical Field (Concept)

The disclosure describes a method of utilizing the network infrastructure of the 5G standard that defines identification of a quality class for the 5G network (a 5G quality of service identifier, a 5G QoS identifier, a 5QI) in order to reduce latency (e.g., screen freeze) in a real time streaming service. The disclosure provides a parallel data streaming, and one data streaming is a channel for data that needs a high bandwidth, and another data streaming is data that needs a low waiting time. A communication channel is implemented via a network slice that satisfies the above-described requirements and provides a feature of securing a necessary QoS level.

In the embodiments of the disclosure, a "video stream" and a "data stream" may be interchangeably used. The disclosure is inspired by an existing technical problem that faces with a game streaming industry that streams a video from a service provider to a user. However, various embodiments of the disclosure may be used in other industries without limitation. Therefore, various embodiments of the disclosure use a normal term "data stream" in order to increase an applicable range.

For ease understanding of the disclosure, hereinafter, a "video stream" that is easily understandable than a "data stream" that is a normal concept is used as an example.

1.2. Background

The disclosure is to provide to an ultra low latency media interface. Game streaming is the field of interest of the development of ultra low latency media interface.

A real-time streaming service is enabled by low network latency and the high performance of a data center. One of the services difficult to deal with is a game business that needs to perform quick and efficient bidirectional communication with low latency. A network needs to provide a significantly low waiting time and a low package error rate. In the past, only a game that has client-side rendering is capable of being used via a web. However, nowadays, a user (after registering with a platform) is capable of controlling a character in a game that needs significantly dynamic and professional hardware.

Currently, the most popular game services (or game streaming services) today include Nvidia GeForce Now and PlayStation Now.

In the future, it is expected that an augmented reality (AR)/virtual reality (VR) or metaverse game will be a new type of entertainment. In order to provide high-quality content, a new task may be given to a network provider and a streaming service.

Figure 4:
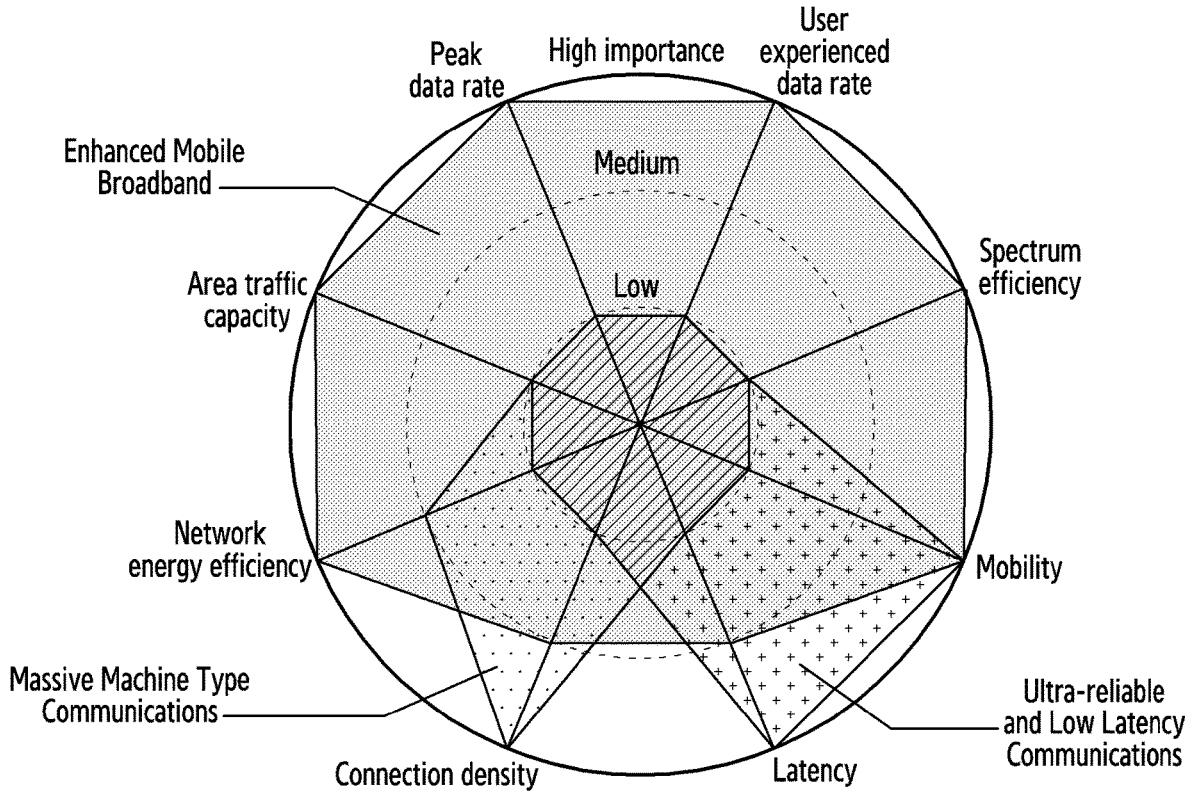
FIG. 4 is a diagram illustrating a 5G usage scenario in association with eMBB, mMTC, and URLLC according to an embodiment of the disclosure.

FIG. 4 is a diagram illustrating a 5G usage scenario in association with eMBB, mMTC, and URLLC according to an embodiment of the disclosure.

Referring to FIG. 4, 5G communication includes enhanced mobile broadband (eMBB), massive machine-type communications (mMTC), and ultra-reliable low latency communications (URLLC). The eMBB has advantages from the perspective of a peak data rate, a user experienced data rate, area traffic capacity, spectrum efficiency, network energy efficiency, mobility, but has disadvantage from the perspective of connection density and latency. The mMTC may have a strong point from the perspective of connection density. The URLLC may have a strong point from the perspective of latency.

2. Problem

2.1. Related Art (Currently Used Method)

The latest technology:

2.1.1. A user registers with a game streaming service. Basically, a service provider is in charge of producing a game stream that is a video stream. A user may provide an input to a service provider using a touch screen or a mouse.

2.1.2. A method of reducing the latency of a streaming service.

a. A predicted system for a streaming service b. Compression of streaming 2.1.3. A network infrastructure provides a method with a short waiting time. Currently, the 5G standardization is performed with respect to 5 types of mainly used case-related product groups that require unique requirements for connection: Among the enhanced mobile broadband (eMBB), the ultra-reliable low latency communications (URLLC), the massive IoT (mIoT), the vehicle to everything (V2X), and the high-performance machine-type communications (HMTC), the eMBB service is a dedicated service that requires a high-bandwidth, and is used for streaming a video to a mobile device.

2.2. The Problems of the Related Art

The latest solution has the following drawbacks.

a. Latency—needs to be significantly low to satisfy a user. A high waiting time in game streaming does not reflect the reality of a game. The waiting time needs to be as low as possible.

b. Limited bandwidth—In both a client side and a server side, the bit rates of an uplink and a downlink need to be at least 1 Mbps in the case of a low resolution game, and the bit rates of an uplink or a downlink need to be at least 30 Mbps in the case of a 4K resolution game, depending on requirements and subscription. The latency of the video stream may occur when a network latency faces with a local peak. A game may be stopped from the point of view by the user.

3. Solution

3.1. Concept/Summary/Abstract

The disclosure describes a system and a method for reducing latency in a data/game streaming service by configuring a multi-splice connection between a service provider and a user. The eMBB service is used for transferring a high-quality video content, and the URLLC service is used for transferring service-based metadata that is used for producing a missing frame that replaces a standard video stream transferred from the service provider.

The term "video stream" used in various embodiments of the disclosure may be replaced with a "data stream" that is more generally used and is capable of providing a wide protection. The term "frame" may be replaced with a "data package".

3.2. Technical Characteristics

The currently used existing technology relates to a method of predicting a game streaming service or a compressing method. The two methods use a single connection between a server to a client device. The methods may not correct deterioration in a network connection.

In order to utilize 5G network slicing, a data stream needs to be separated (one for a video and the other is for metadata) so as to provide a URLLC stream with a significantly low slatency and network slicing management is required.

Various embodiments of the disclosure may provide the following technical effects.

Improve user experience (reduce latency and have connection with a low waiting time)

A backup communication channel utilizing two slices—there is a high possibility of maintaining a connection using two separate communication channels.

The possibility of transferring a parallel content to a final user (or a supplementary content associated with the eMBB transferred via the URLLC).

Content may be transferred via two or more access points (improvement of reliability)

Before a final user is aware of the magnitude of latency while receiving a package via an eMBB slice, an action may be taken in advance using information associated with a network infrastructure. The action taken in advance provides an extra time to terminate a device to reduce latency using parallel channels.

Through the proposed solution, the service provider may transfer two parallel data streams using a following parameter.

For the eMBB, the maximum data speed of 10 to 20 Gbps may be provided.

For the URLLC, a radio interface waiting time less than 1 ms may be provided, and the URLLC may be used significantly reliably during 99.9999% of the time, and may provide a medium-low speed (approximately 50 kbps to 10 Mbps).

3.3. Implementation

3.3.1. Implementation of Technology

Various embodiments of the disclosure propose use of two types of service categories for transferring a data streaming to a final user.

In various embodiments of the disclosure, all types of streams (audio, video, data) may be used. However, in the embodiment below, description will be provided with reference to a video stream. Other types of streams will be described later on.

A service provider provides a visual content (game video) via an enhanced mobile broadband (eMBB) slice that is a high-capacity service designed for video broadcasting. The eMBB has a low latency but is unreliable and thus, may have a feature of having a high bandwidth. Additional metadata (described later) provides by the service provider via an ultra-reliable low latency communication (URLLC) slice designed for a device that is sensitive to a waiting time.

FIG. 5 is a signal flowchart among a streaming service provider (SSP), a network operator (NOP), and a streaming service client (SSC) in a wireless communication system according to an embodiment of the disclosure.

Referring to FIG. 5, the SSP and the NOP activate two network slices (eMBB and URLLC) in operation 510.

In operation 520, the SSP establishes a connection with the SSC via two services (eMBB and URLLC).

In operation 530, the SSP prepares a data stream part to be transmitted to the SSC. The first data is a data stream content, and second data is a metadata of the first data.

In operation 540, the SSP transmits the first data to the SSC via the eMBB, and transmits the second data via the URLLC. In the example shown in FIG. 5, it is assumed that an error occurs in transmission of the first data via the eMBB.

In operation 550, the SSC receives the first data and the second data via the eMBB and the URLLC.

In operation 560, in the case in which the first data is successfully received via the eMBB, the SSC directly produces a data stream from the first data. However, in the case in which the first data is not successfully received via the eMBB, the SSC indirectly produces a data stream via the metadata of the second data. Although a high payload data transmitted via the eMBB is not completely received, a data stream may be produced by the SSC. Based on low payload metadata received via the reliable URLLC, a data stream is produced locally in the SSC.

Roles:

1. Streaming service (SS)—a low-latency streaming service configured as follows:

1-1. A streaming service server (SSS)—the whole of components of the server side of an SS. The SSS may be implemented in a monolithic manner or in a manner of a distributed application program in which various components interact.

1-1-1. A streaming service subscriptions database (SS-SDB)—a unique component of the SSS that stores and manages subscription in order to access the SS.

1-2. A streaming service client (SSC)—a client application program installed in a user equipment (UE—e.g., a smartphone or a personal computer (PC)) of a streaming service user (SSU).

2. A streaming service provider (SSP)—provides an SS and is the party that provides the SS. The SSP utilizes a network slice provided from the NOP and thus, the SSP is a tenant of the NOP.

3. A streaming service user (SSU)—a final SS user (UE—e.g., a smartphone or PC) who utilizes the SS via an SSC installed in the UE.

4. A network operator (NOP)—provides a network slice that supports the operation of the SS.

Figure 6:
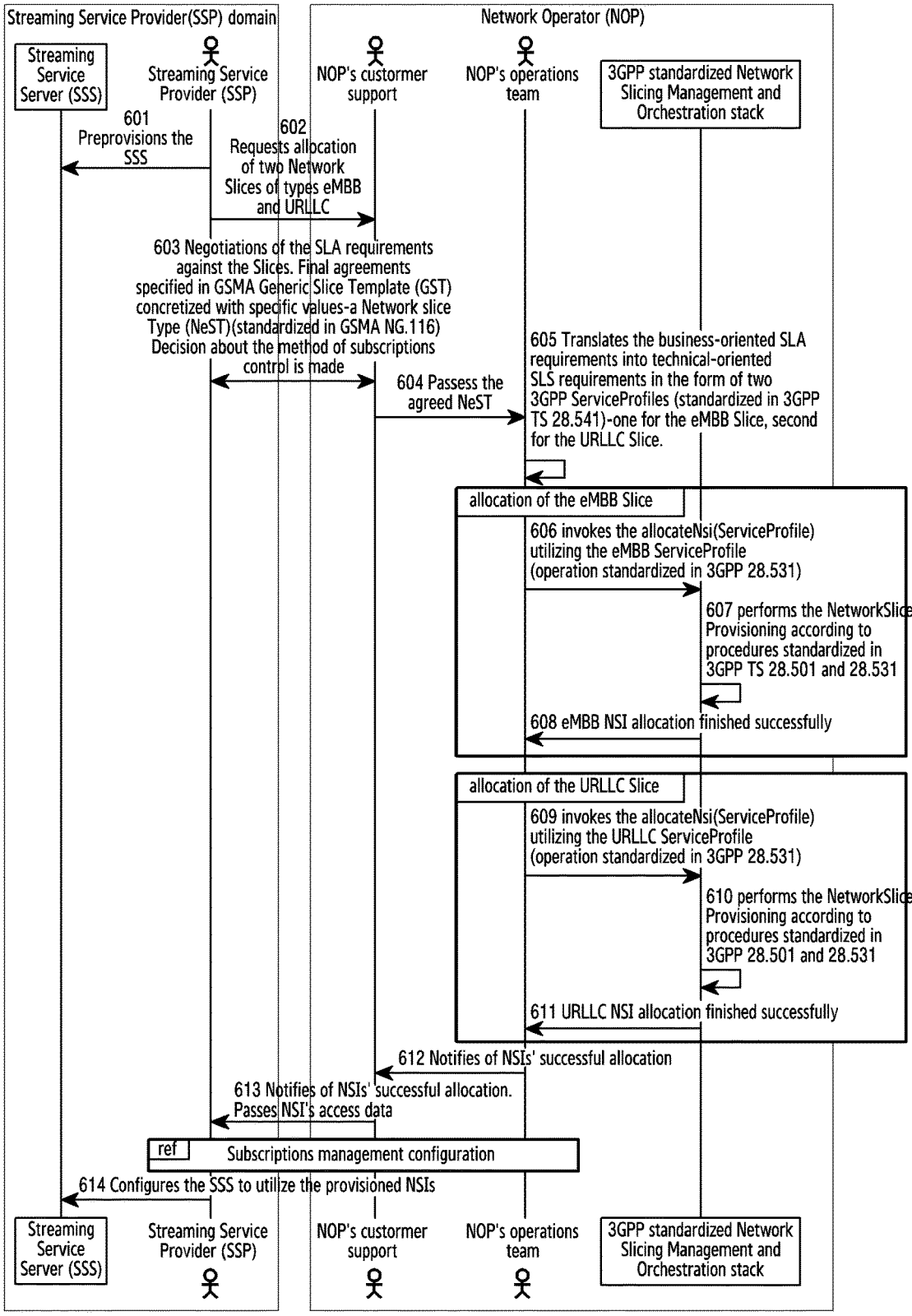
FIG. 6 is a signal flowchart between an SSP and a NOP in a wireless communication system according to an embodiment of the disclosure.

FIG. 6 is a signal flowchart between an SSP and a NOP in a wireless communication system according to an embodiment of the disclosure.

Particularly, FIG. 6 relates to SS offering establishment in the 5G network.

Referring to FIG. 6, a first option illustrates a case in which a streaming service server (SSS) is installed in the Internet. The NOP provides a network slice in a "network slice as NOP internals" mode.

The entities in an SSP domain may include an SSS and an SSP, and the entities in a NOP domain may include a NOP's customer support node, a NOP's operation team node, and a 3rd generation partnership project long term evolution (3GPP) standardized network slicing management and orchestration stack.

In operation 601, the SSP provides preprovisions to the SSS.

In operation 602, the SSP requests allocation of two types of network slices that are eMBB and URLLC, from the NOP's customer support node.

In operation 603, the negotiation on SLA requirements associated with slices is performed between the SSP and the NOP's customer support node. A final agreement is obtained that is designated in a GSMA generic slice template concretized with a predetermined value. Agreement on a network slice type (NeST) (standardization in GSMA NG.116) is performed. In addition, a subscription control method is determined.

In operation 604, the NOP's customer support node transmits agreed NeST information to the NOP's operation team node.

In operation 605, the NOP's customer support node translates business-oriented SLA requirements into technical-oriented SLS requirements in the form of two 3GPP service profiles (standardized in 3GPP TS 28.541). One is for an eMBB slice, and the other is for a URLLC slice.

Allocation of the eMBB slice may be performed according to operations 606-608.

In operation 606, the allocated Nsi (service profile) is called using an eMBB service profile. (the operation standardized in 3GPP 28.531)

In operation 607, the 3GPP standardized network slicing management and orchestration stack performs network slice provisioning according to procedures standardized in 3GPP TS 28.501 and 28.531.

In operation 608, eMBB NSI allocation is successfully completed.

Allocation of the URLL slice may be performed according to the operations 609-611.

In operation 609, the allocated Nsi (service profile) is called using a URLLC service profile. (the operation standardized in 3GPP 28.531)

In operation 610, the 3GPP standardized network slicing management and orchestration stack performs network slice provisioning according to procedures standardized in 3GPP TS 28.501 and 28.531.

In operation 611, URLLC NSI allocation is successfully completed.

In operation 612, the NOP's operator team node notifies the NOP's customer support node of successful allocation of NSIs.

In operation 613, the NOP's customer support node notifies the SSP of the successful allocation of the NSIs, and transmits access data of the NSIs.

In operation 614, the SSP configures an SSS to utilize the provisioned NSI.

Figure 7:
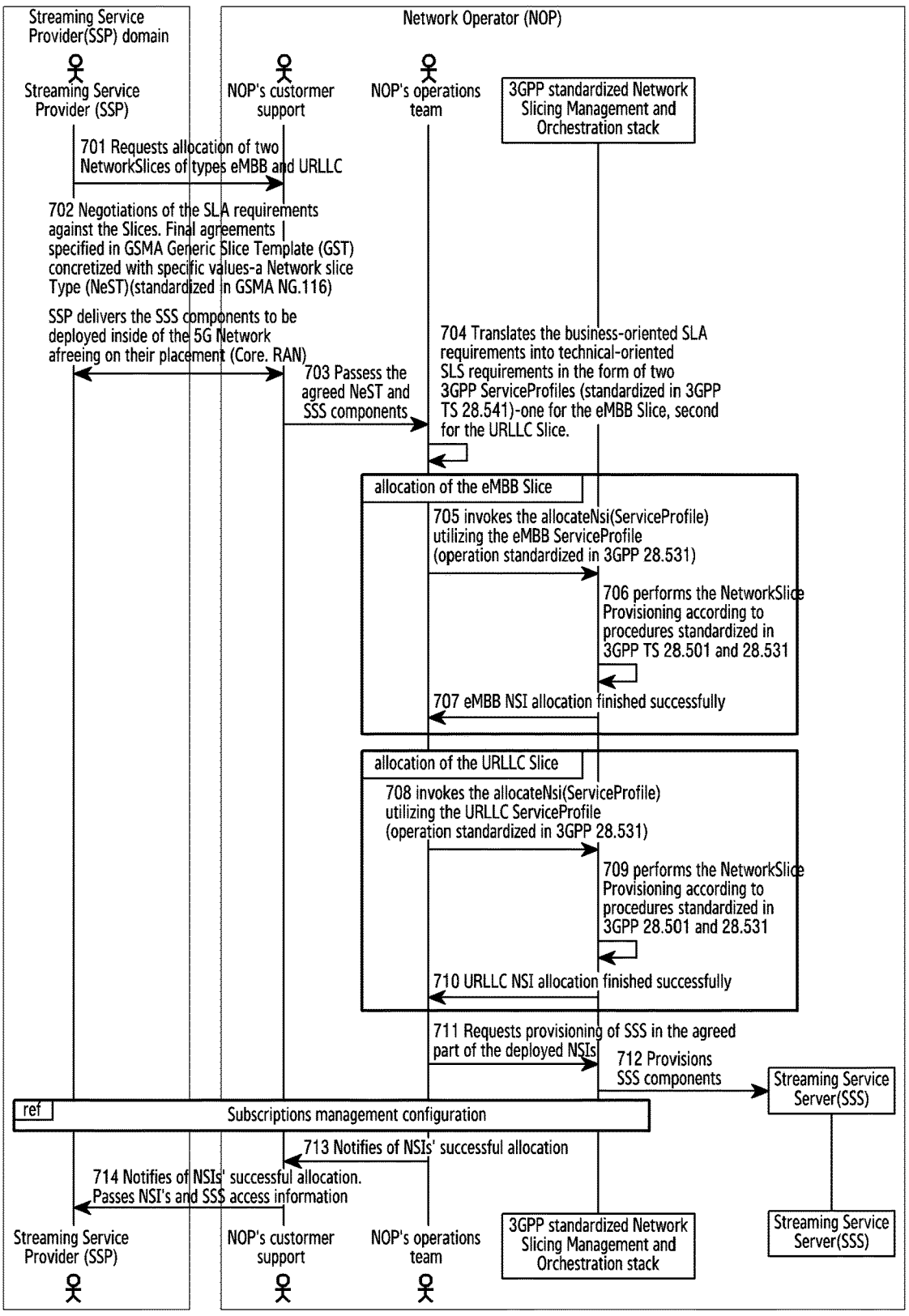
FIG. 7 is a signal flowchart between an SSP and a NOP in a wireless communication system according to an embodiment of the disclosure.

FIG. 7 is a signal flowchart between an SSP and a NOP in a wireless communication system according to an embodiment of the disclosure.

Particularly, FIG. 7 relates to SS offering establishment in the 5G network.

Referring to FIG. 7, a second option illustrates the case in which a streaming service server (SSS) is disposed as a part of the 5G network. The NOP provides a network slice in a "network slice as NOP internals" mode.

The entity in an SSP domain includes an SSP, and the entities in a NOP domain include a NOP's customer support node, a NOP's operation team node, a 3GPP standardized network slicing management and orchestration stack, and an SSS.

In operation 701, the SSP requests allocation of two types of network slices that are eMBB and URLLC, from the NOP's customer support node.

In operation 702, the negotiation on SLA requirements associated with slices is performed between the SSP and the NOP's customer support node. A final agreement is obtained that is designated in a GSMA generic slice template concretized with a predetermined value. Agreement on a network slice type (NeST) (standardization in GSMA NG.116) is performed. The SSP provides SSS components to be disposed inside the 5G network that agrees on their deployment. (Core, RAN).

In operation 703, the NOP's customer support node transmits agreed NeST information and the SSS component information to the NOP's operation team node.

In operation 704, the NOP's customer support node translates business-oriented SLA requirements into technical-oriented SLS requirements in the form of two 3GPP service profiles (standardized in 3GPP TS 28.541). One is for an eMBB slice, and the other is for a URLLC slice.

Allocation of the eMBB slice may be performed according to operations 705-707.

In operation 705, the allocated Nsi (service profile) is called using an eMBB service profile. This operation is standardized in 3GPP 28.531.

In operation 706, the 3GPP standardized network slicing management and orchestration stack performs network slice provisioning according to procedures standardized in 3GPP TS 28.501 and 28.531.

In operation 707, eMBB NSI allocation is successfully completed.

Allocation of the URLLC slice may be performed according to operations 708-710.

In operation 708, the allocated Nsi (service profile) is called using a URLLC service profile. (The operation standardized in 3GPP 28.531)

In operation 709, the 3GPP standardized network slicing management and orchestration stack performs network slice provisioning according to procedures standardized in 3GPP TS 28.501 and 28.531.

In operation 710, URLLC NSI allocation is successfully completed.

In operation 711, the NOP's operation team node requests provisioning of the SSS in the agreed part of the distributed NSIs, from the 3GPP standardized network slicing management and orchestration stack.

In operation 712, the 3GPP standardized network slicing management and orchestration stack may perform provisioning the SSS components to the SSS.

In operation 713, the NOP's operator team node notifies the NOP's customer support node of successful allocation of NSIs.

In operation 714, the NOP's customer support node notifies the SSP of successful allocation of NSIs and transmits access data of the NSIs.

Figure 8:
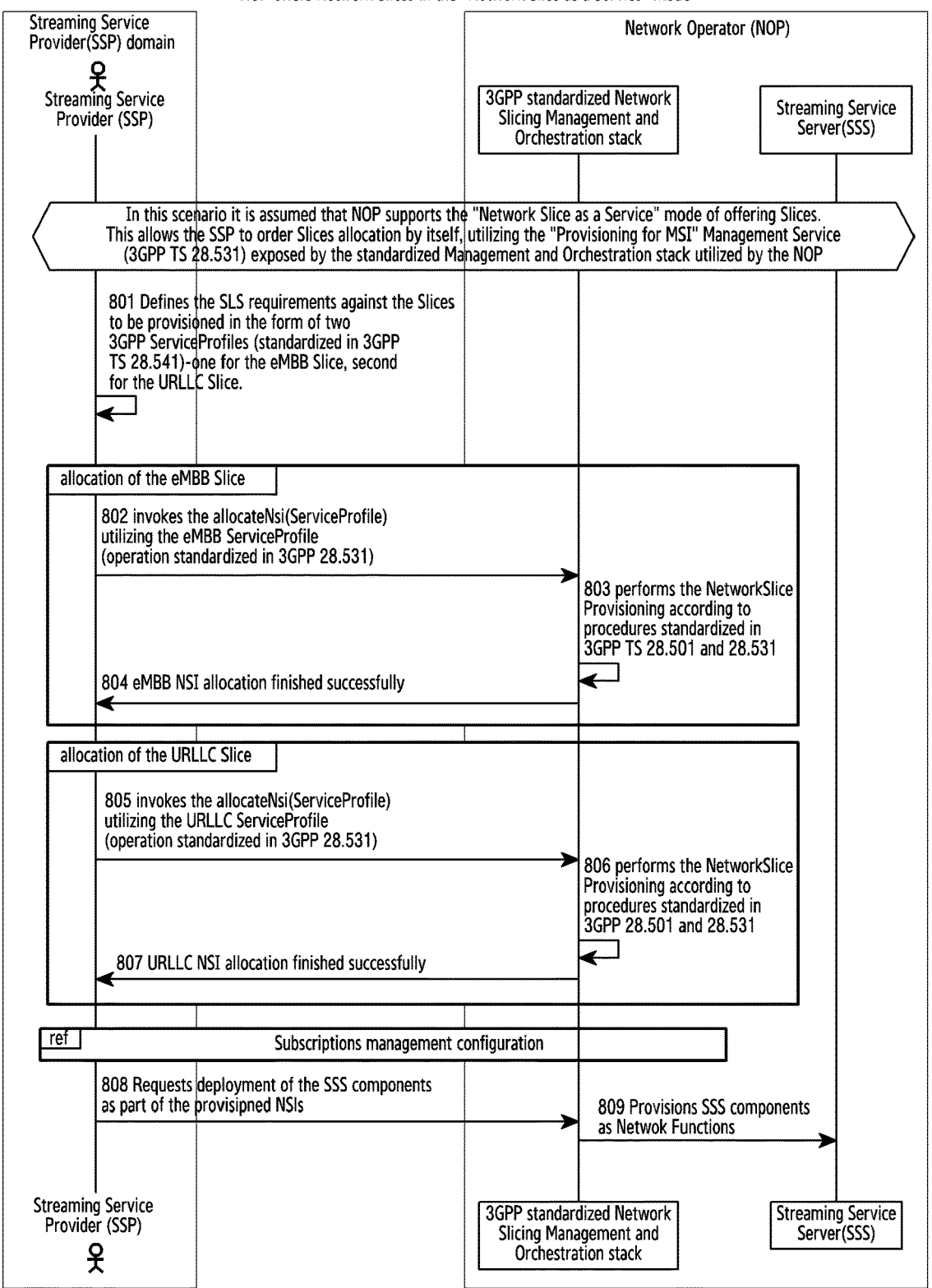
FIG. 8 is a signal flowchart between an SSP and a NOP in a wireless communication system according to an embodiment of the disclosure.

FIG. 8 is a signal flowchart between an SSP and a NOP in a wireless communication system according to an embodiment of the disclosure.

Particularly, FIG. 8 relates to SS offering establishment in the 5G network.

Referring to FIG. 8, a second option illustrates the case in which a streaming service server (SSS) is disposed as a part of the 5G network. The NOP provides a network slice in a "network slice as NOP internals" mode.

The entity in an SSP domain includes an SSP, and the entities in a NOP domain include a 3GPP standardized network slicing management and orchestration stack, and an SSS.

In the embodiment illustrated in FIG. 8, it is assumed that the NOP supports a "network slice as a service" mode that provides a slice.

Through the above, the SSP may autonomously request slice allocation using a "provisioning for NSI" management service (3GPP TS 28.531) exposed by the standardized management and orchestration stack utilized in the NOP.

In operation 801, the SSP defines SLS requirements associated with a slice to be provisioned in the form of two 3GPP service profiles. One is for an eMBB slice, and the other is for an URLLC slice.

Allocation of the eMBB slice may be performed according to operations 802-804.

In operation 802, the allocated Nsi (service profile) is called using an eMBB service profile. This operation is standardized in 3GPP 28.531.

In operation 803, the 3GPP standardized network slicing management and orchestration stack performs network slice provisioning according to procedures standardized in 3GPP TS 28.501 and 28.531.

In operation 4, eMBB NSI allocation is successfully completed.

Allocation of an URLLC slice may be performed according to operations 805-807.

In operation 805, the allocated Nsi (service profile) is called using a URLLC service profile. (the operation standardized in 3GPP 28.531)

In operation 806, the 3GPP standardized network slicing management and orchestration stack performs network slice provisioning according to procedures standardized in 3GPP TS 28.501 and 28.531.

In operation 807, URLLC NSI allocation is successfully completed.

In operation 808, the SSP requests deployment of SSS components as a part of the provisioned NSI.

In operation 809, the 3GPP standardized network slicing management and orchestration stack performs provisioning of the SSS components to the SSS.

Figure 9:
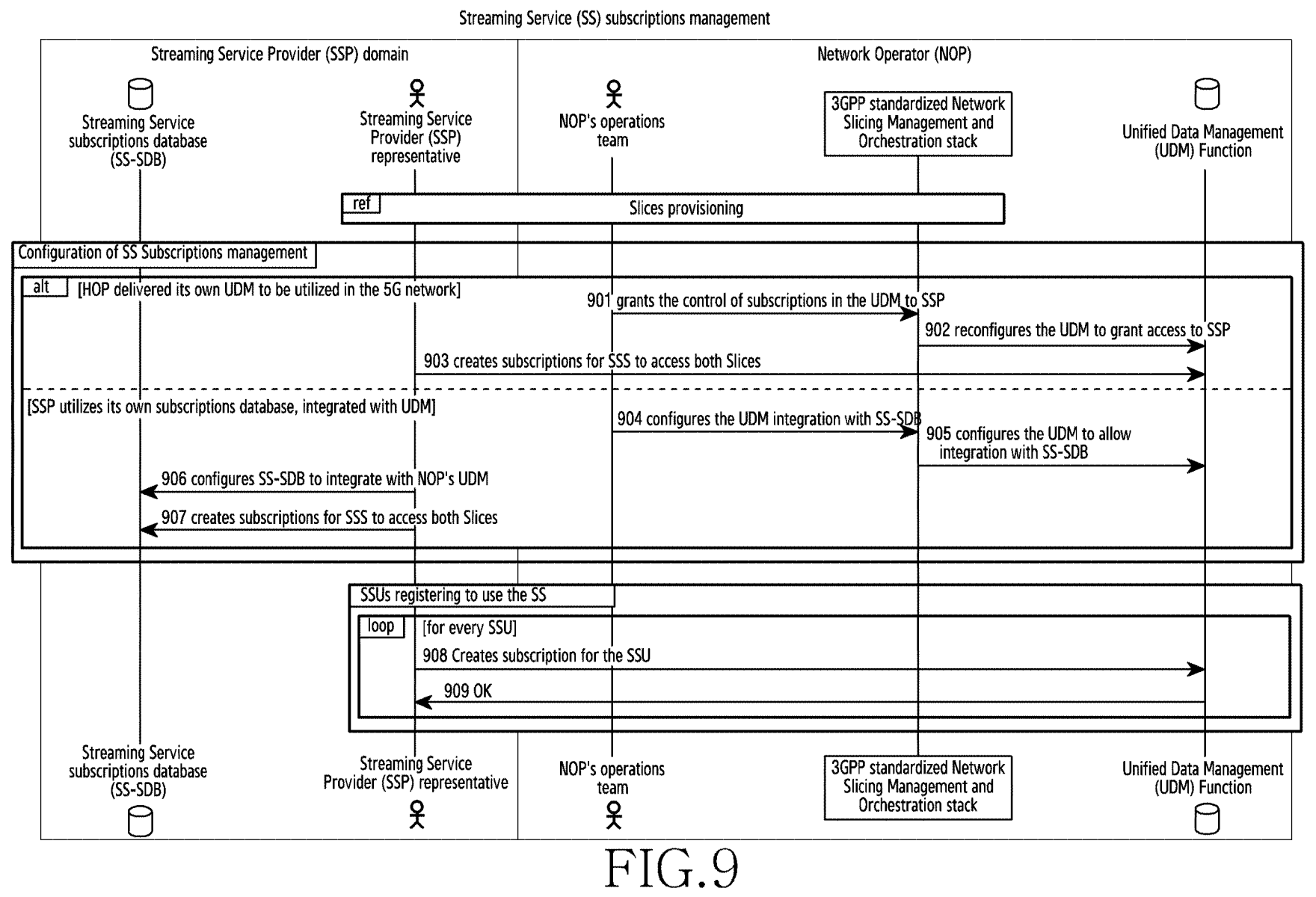

FIG. 9 is a signal flowchart between an SSP and a NOP in a wireless communication system according to an embodiment of the disclosure.

Particularly, FIG. 9 relates to SS offering establishment in the 5G network.

Referring to FIG. 9, the entities in an SSP domain include a streaming service subscriptions database (SS-SDB) and an SSP representative node. The entities in the NOP domain include a NOP's operations team node, a 3GPP standardized network slicing management and orchestration stack, and a unified data management function node.

The configuration of SS subscription management may be performed according to operations 901-907.

In operation 901, the NOP operation team node reports, to the 3GPP standardized network slicing management and orchestration stack, that the right to control subscription to the UDM is granted to the SSP.

In operation 902, the 3GPP standardized network slicing management and orchestration stack reconfigures the UDM so as to grant, to a UDM function node, the right to access the SSP In operation 903, the SSP representative node produces subscription to the SSS in order to access two slices.

In operation 904, the NOP operation node configures to integrate an SS-SDB and the UDM.

In operation 905, the 3GPP standardized network slicing management and orchestration stack reconfigures the UDM to allow integration with the SS-SDB.

In operation 906, the SSP representative node configures an SS-SDB to integrate with the UDM of the NOP.

In operation 907, the SSP representative node may produce subscription to the SSS in order to access two slices.

The process of registering an SSU in order to use the SS are performed according to operations 908 and 909.

In operation 908, the SSP representative node provides subscription to the SSU.

In operation 909, the UDM function node confirms subscription to the SSU.

Technical steps of the various embodiments of the disclosure are as follows.

Step I—Establishment of an SS Proposal in the 5G Network.

1. A first option—an SSP which is a user of slices provided by a NOP, an owned infrastructure of an SSP, or an SSS installed in the Internet (a corresponding component is not integrated as a part of a distributed slice).

1-1. The SSP includes the following, transfers service level agreement/service level specification (SLA/SLS)

requirements (e.g., groupe special mobile association (GSMA), generic slice template (GST)) that the slice satisfies, and requests the NOP to allocate two network slices (eMBB, URLLC)

1-1-1. Specifications of an essential bandwidth value and an expected average waiting time of an eMBB slice.

1-1-2. Restrict a waiting time that is incapable of intersecting with a URLLC slice 1-2. the NOP provides a slice needed according to a procedure defined in the 3GPP standard.

1-3. Via the NOP, the SSP controls subscription so that an SSU is capable of accessing a produced slice. That may be conducted via the following steps.

1-3-1. Assign, to the SSP, the right to control subscription to a unified data management/unified data repository (UDM/UDR) via the NOP 1-3-2. Integrate a subscription database of the SSP with the UDM/UDR of the NOP (e.g., the NOP supports a "network functions owned by Network Slice Customer" characteristic of GSMA GST 3.4.15).

1-4. The SSP configures the SSS to utilize the two slices allocated to transfer data to the SSC.

1-5. The NOP activates a requested slice. The SSU may now be capable of being connected to a slice that supports the SS.

2. A second option—an SSS distributed as a part of produced slice (in the case in which a NOP supports integration of tenant components in the 5G network)

2-1. Although two slices are configured in the similar manner as the first option, the entire SSS or corresponding components may be included in a distributed slice.

2-1-1. This scheme may reduce a non-deterministic operation of the Internet, and may increase the possibility of providing a high level of QoS.

2-2. The disposition of SSS components in the 5G network may be obtained, for example, according to the following method.

2-2-1. The NOP supports a European telecommunications standards institute (ETSI) multi-access edge computing (MEC) architecture integrated with the 5G system. In this instance, the SSS components are distributed as a network function inside a MEC framework.

2-2-1-1. The SSS or the components selected from the SSS are transferred to the NOP as a virtual network function (VNF) or a VNF set to be distributed via a MEC application.

2-2-1-2. The NOP distributes an SSS MEC application and configures the same as a part of two slices.

2-2-2. The NOP allows to directly dispose the network function (NF) of a tenant in the 5G network.

2-2-2-1. That may be designated when a slice configuration is negotiated via the "network functions owned by a network slice customer" characteristic of GSMA GST 3.4.15.

2-2-2-2. According to the negotiation with the NOP, the SSS components may be distributed to a reliable data network (a reliable DN) or an external data network (an external DN).

2-2-2-2-1. A reliable data network: the SSS components may be capable of directly accessing a 5G function, and may directly have an effect thereon.

2-2-2-2-2. An external data network: the SSS components may interact with a 5G function via a network exposure function (NEF), and thus, may restrict a function of having an effect on the operation of the 5G function.

2-2-2-3. The control plane component of the SSS may be distributed as an application function (AF). Therefore, in order to optimize SS provision, the control plane function and operation of the 5G network control plane may be adjusted. (e.g., having an effect on traffic routing).

2-2-2-4. The user plane component of the SSS may be disposed in a data network so as to be close to a user plane function (a reliable DN or an external DN), and this reduces a waiting time experienced and increases an SS availability.

Step II—Establishment of a Connection Between the SSC and the SSS

1. The SSU registers with the SS (opens an account), and installs the SSC in its UE.

2. The UE is updated with new "configured NSSAI" information including single network slice selection assistance information (S-NSSAI) of a slice that the UE needs to access in order to utilize the SS.

2-1. The updated "configured NSSAI" is transferred to the UE during a "UE parameters update via UDM control plane procedure" that is started by a unified data management (UDM) function, or during a "UE configuration update" procedure that begins by an access and mobility function (AMF).

2-2. Alternatively, the S-NSSAI may be transferred to the UE from the SSC that is to update the "configured NSSAI" of the UE.

2-3. The processing associated with configuring of UE NASSAI and storing of NSSAI are described in clause 5.15.4 of 3GPP TS 23.501 V17.0.0.

3. The SSC starts to connect to the SSS via two slices that supports the SS.

3-1. The UE starts to connect to multiple slices using two S-NSSAIs, and establishes a connection via an eMBB slice and a URLLC slice configured in the SSC. According to the 5G standard 3GPP TS 23.501 V17.0.0, the UE which is a data receiver may simultaneously access a maximum of 8 slices according to the 3GPP specifications.

3-2. "UE registration procedure" follows the description defined in clause 4.2.2 of 3GPP TS 23.502 V17.0.0, and the updated "configured NSSAI" is transferred as a "requested NSSAI".

4. The SSP receives information associated with two connections configured by the SSC (via two slices).

4-1. Connections from the URLLC and eMBB slices may be distinguished as follows.

4-1-1. The SSC includes a slice or stream type in a request for the SSS.

4-1-2 The SSS distinguishes a slice type or a stream type based on a previously known IP address range that belongs to a predetermined slice.

4-1-3. A mobile network such as a user-plane function (UPF) enhances a request using information associated with a slice.

4-1-4. An SSS instance may be configured to receive only a request from a predetermined slice, such as an interface configuration.

Step III—Utilization of a Slice by the SSP

1. The eMBB is used to transmit a large capacity of data (e.g., a video stream).

2. The URLLC is used to transmit metadata that supports the eMBB.

2-1. The metadata may be used for approximating/predicting/producing data in order to imitate a content to be transmitted via the eMBB (e.g., a missing frame of a video stream).

2-2. In the case in which a data package is not received via the eMBB on time (latency occurs), data received via the URLLC is used for displaying a new frame (referred to as a missing frame production process).

2-3 The missing frame production process is defined by the SSP. There are several possible strategies as follows.

2-3-1. A new frame is produced based on a past frame by transferring, via the URLLC, information associated with image movement between video frames, enlargement/reduction, rotation or other conversions.

2-3-2. Transfer, via the URLLC, information associated with an image area and a method of converting the area in order to obtain a predicted result from a subsequent frame (task may be performed using OnDevice AI and generative adversarial network (GAN) network, or may be performed using other networks trained to perform a required task).

2-3-3. Transferred via a URLLC low-resolution stream directly displayed after a frame transferred via the eMBB.

2-3-3-1. A low-resolution stream may be upscaled using a dedicate-OnDevice AI module.

3. The SSP utilizes network slice operation information (present, past, and prediction), and may provide an algorithm that controls slice utilization by the SSS and SSU.

3-1. Example of enrichment information:

3-1-1. Per slice performance metric (per slice performance metrics)

3-1-2. Per slice fault (per slice faults)

3-1-3. Per slice access network element utilization (per slice access network elements utilization)

3-1-4. Per UE radio condition (per UE radio conditions) (e.g., a mobility level: fixed, high-speed, frequent roaming).

3-1-5. O-RAN Near-RT RIC exposure information: the case of use of O-RAN xApp/rApps needs to be analyzed (annex A of O-RAN.WG2.Non-RT-RIC-ARCH-TR-v01.01).

3-1-6. Per slice core network elements utilization (per slice core network elements utilization)

3-1-7. Other information—TBU 3-2. The enrichment information may be transferred by a management data analytics function (MDAF), a network data analytics functionality (NWDAF), and a management data analytics service (MDAS).

3-3. The enrichment information may be utilized, for example, in the SSP, as follows.

3-3-1. In order to prevent latency of a package delivery to the SSC via the eMBB, the eMBB may determine slice switch to the URLLC.

3-3-2. The URLLC is switched again to the eMBB slice.

3-3-3. A message is transferred to the SSC in order to prepare a device for slice switch.

Step IV—UE Operation

1. Establish a connection to a service provider via slices associated with both eMBB and URLLC connection mechanisms.

2. The UE receives two data streams from the SSS via the SSC.

2-1. Streaming (e.g., video streaming) via the eMBB including a large amount of data.

2-2. A stream via the URLCC includes metadata used for backing up or supporting an eMBB stream (e.g., reduce the latency of a video stream).

3. Analyze package latency 3-1. Calculate the difference between the timestamp of a sent package and the current time. In the case in which the difference exceeds a defined threshold, the utilization of a URLLC content starts.

3-2. Identify a package path—in the case in which a path is longer than a defined path (having a high possibility of being delayed), the system starts utilization of a URLLC content.

3-3. Identify UDP package latency (one-way active measurement protocol (OWAMP) and two-way active measurement protocol (TWAMP) protocol)

4. In the case in which the data package of the eMBB slice is missing (or is not received at a defined time) or is delayed (exceeds a threshold value), the system starts a URLLC data utilization process).

4-1. A defined strategy is implemented in the SSP.

4-2. A stream transmitted via the URLLC is used for replacing an eMBB stream (e.g., produce a missing frame).

4-3. A process is continued until a network parameter and a waiting time satisfy a defined parameter (defined by the SSP).

5. In the case in which new data is received via the eMBB on time or by satisfying an available waiting time parameter, the system replaces the produced data (URLLC stream) with data newly received via the eMBB. (Note: In the case of a video stream, a delayed frame is not displayed. The delayed frame needs to be deleted and may be replaced with URLLC data.)

Figure 10:
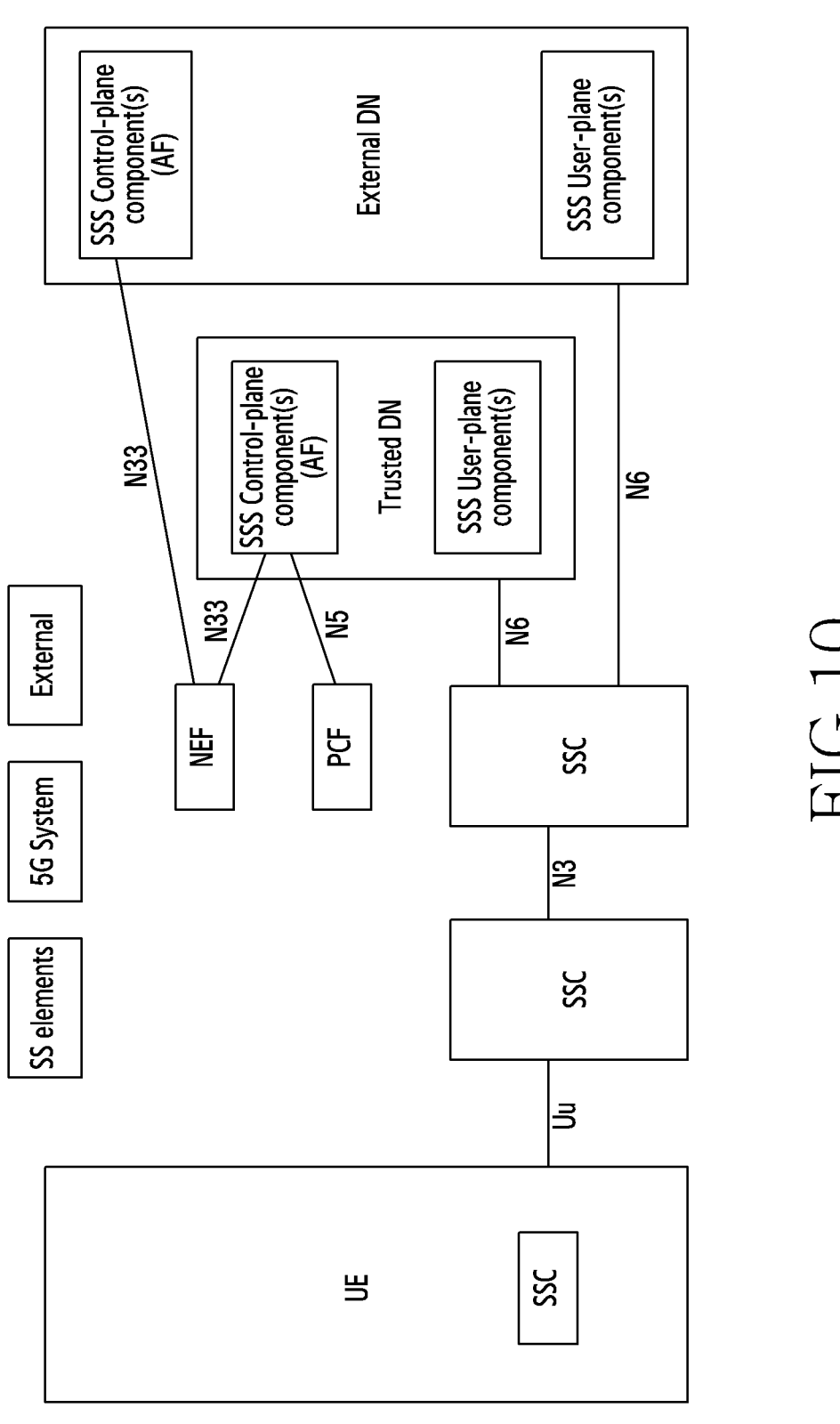
FIG. 10 is a diagram illustrating an example of integrating SSS components in a NOP 5G network in a wireless communication system according to an embodiment of the disclosure.

FIG. 10 is a diagram illustrating an example of integrating SSS components in a NOP 5G network in a wireless communication system according to an embodiment of the disclosure.

The embodiment of FIG. 10 is based on FIG. 4.3.2-1 of 3GPP TR 26.928, and this describes the possibility of integrating an eXtended Reality service in the 5G network.

Referring to FIG. 10, a terminal, (i.e., a UE) includes an SSC, and is connected to a base station, (i.e., a radio access network (RAN)) and a Uu interface.

The RAN is connected to a UPF via an N3 interface.

An external EN includes SSS control plane components (AF) and SSS user plane components.

A trusted DN includes SSS control plane components (AF) and SSS user plane components.

The SSS control plane components (AF) in the external DN are connected to an NEF via an N33 interface.

The NEF is connected to the SSS control plane components (AF) in the trusted DN via the N33 interface.

A PCF is connected to the SSS control plane components (AF) in the trusted DN via an N5 interface.

An UPF is connected to the trusted DN via an N6 interface.

The UPF is connected to the external DN via the N6 interface.

Figure 11:
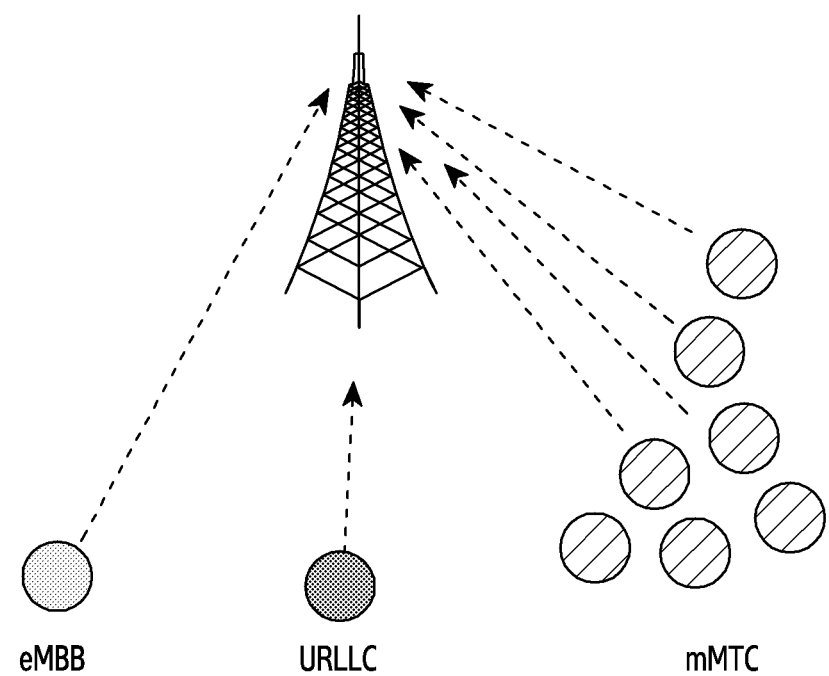
FIG. 11 is a diagram illustrating an example of a 5G network system according to an embodiment of the disclosure.

FIG. 11 is a diagram illustrating an example of a 5G network system according to an embodiment of the disclosure.

Referring to FIG. 11, a base station may be connected to other nodes via three types of 5G services, such as eMBB, URLLC, and mMTC.

The eMBB provides a fast data speed, the URLLC provides a low latency, and the mMTC provides a multi-connection to a plurality of nodes.

Figure 12:
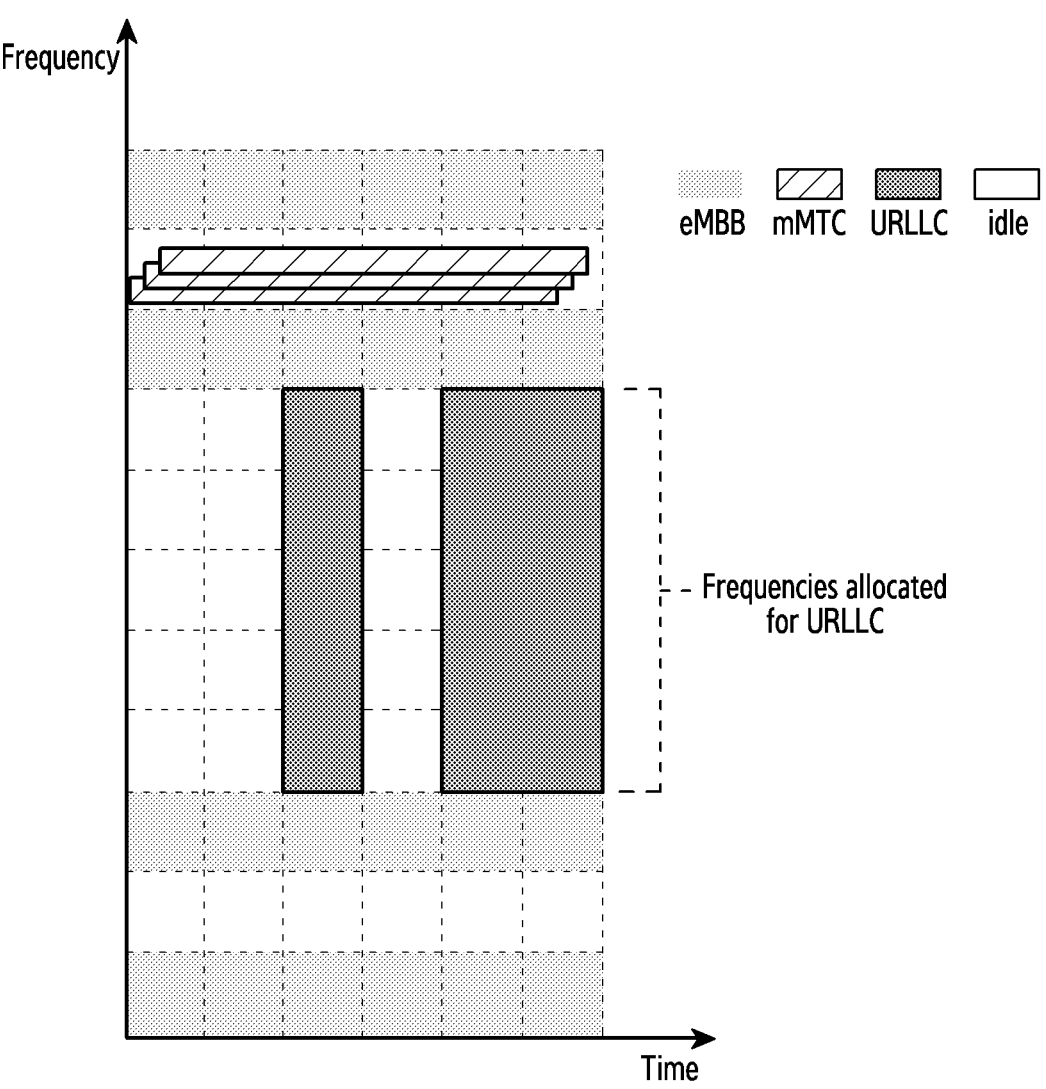
FIG. 12 is a diagram illustrating uplink transmission from devices that use three types of normal 5G services to a common base station according to an embodiment of the disclosure.

FIG. 12 is a diagram illustrating uplink transmission from devices that use three types of normal 5G services to a common base station according to an embodiment of the disclosure.

Referring to FIG. 12, frequency resources allocated to URLLC are not allocated to eMBB.

Figure 13:
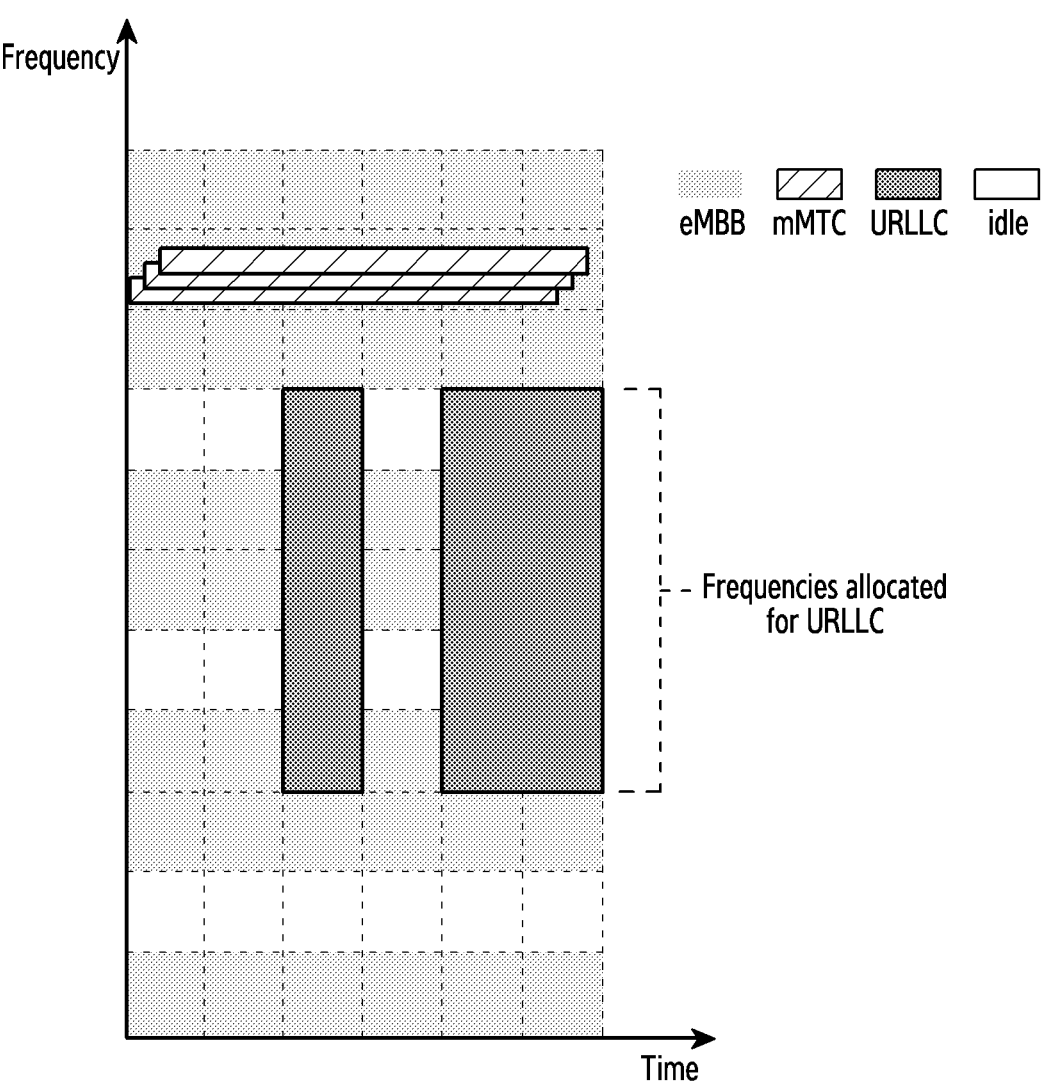
FIG. 13 is a diagram illustrating slicing of a radio resource in a time-frequency frame according to an embodiment of the disclosure.

FIG. 13 is a diagram illustrating slicing of a radio resource in a time-frequency frame according to an embodiment of the disclosure.

Referring to FIG. 13, part of the frequency resources allocated to the URLLC is allocated to the eMBB.

In various embodiments of the disclosure, via allocation of time-frequency resources as shown in FIG. 13, eMBB data and URLLC data may be received.

As described above, various embodiments of the disclosure may be applied to all data streaming services.

1. A low-quality content (perform transmission quickly and change a missing frame).

2. Information associated with a method of producing a new frame based on a frame previously transferred via the eMBB (e.g., maintain a face displayed in the last frame in the video conference and change the movement of the mouth and eyes).

3. Produce a new frame using a GAN network 3-1. The GAN uses only metadata, or may use the metadata and the last frame received via the eMBB together.

4. The metadata may include voice only when the voice is important to a service operator (video is transferred via the eMBB).

5. In a game platform, the URLLC may be used for transmitting a user click event and a mouse movement (from a user to a service provider communication channel).

Various embodiments of the disclosure may be additionally applied to the following improvements.

1. Frame synchronization 1-1. In the case in which data is not compressed and is displayed immediately, additional synchronization may not need to be provided.

1-2. In the case in which a received stream is compressed (both eMBB and URLLC) or a processing time is excessively long, a synchronization process needs to be applied. In this instance, a frame needs to include a timestamp. A device that is to receive a stream and to display a content needs to start URLLC data processing in advance (before a time needed for preparing a new frame). Accordingly, in the case in which latency is detected in the eMBB, a frame produced in a URLLC stream may be displayed.

2. A stream received via the URLLC is not always processed to perform processing of a client device and to reduce the amount of power consumed. In the case in which one of the following conditions is satisfied, data processing and frame preparation begin.

2-1. A frame via an eMBB stream is received after a defined time constraint (detection of latency)

2-2. The quality of a stream via the eMBB deteriorates (it may decrease less than or equal to an allowed level, and a stream latency may occur).

2-3. A missing data package is detected (an error rate exceeds a defined error rate limit)

3. The URLLC is used for transferring an important content (e.g., a vehicle security and immediate blocking system) from the perspective of a service provider. The eMBB is used for transferring a high-capacity of content such as a camera video. In the case in which the latency of the eMBB is detected, the URLLC may perform an additional role described in the main description of the disclosure. That is, the URLLC may perform the following roles.

3-1. Transmit important data 3-2. Perform backup in the case of a problem in eMBB data transmission.

4. The service provider determines to perform slice switch by utilizing information associated with a network infrastructure.

Although it is emphasized in the present disclosure that a user device is capable of making a decision to perform slice switch in the above-description, both a sender and a receiver are capable of making a decision. It differs depending on the case of use and the type of data streamed.

3.3.2 First Embodiment—Reduce the Latency of a Game Streaming Service

1. A smartphone user accesses a game streaming service

2. A 5G slicing function is activated in order to establish the parallel connection of the eMBB and the URLLC.

3 The streaming service provides game streaming in the form of a video stream via the eMBB.

4. In the case of a connection problem, a bandwidth problem or the latency of the eMBB system is switched to the URLLC that transmits metadata with a significantly short waiting time.

5. A user smartphone converts metadata and may transfer a video frame without latency.

6. In the case in which a new frame is transferred (or a missing frame occurs) via the eMBB, the system replaces a produced stream with a stream transferred from a server.

3.3.3 Second and Third Embodiments

3.3.3.1 the Second Embodiment—Reduce Latency by Using a GAN Network

In the case in which latency occurs in a data stream (e.g., a teleconference), the URLLC is used for transferring only information associated with the fact that a user is still speaking (metadata associated with movement of the mouth and eyes)+information associated with imitating sound. In a final user device, the system uses the last frame of the eMBB where a face was present, and produces the eyes and the mouth that move in order to open and close the mouth and to imitate blinking eyes (e.g., use the GAN). A new frame is received via the eMBB, and a frame change process is completed and a standard stream starts being displayed.

3.3.3.2 Third Embodiment—Reduce Latency in Virtual Reality (VR) Gaming

VR is technology significantly difficult to deal with. Latency may occur, and the proposed technology may ease the latency. All video content is shared via the eMBB. In addition, a virtual scene and visual information associated with persons who join a conference are transmitted to a client in advance. In the case in which latency is detected via the eMBB service, the system uses information associated with a virtual scene and a metadata transmitted via the URLLC service. The metadata may be the location of a virtual operator, information used for changing a scene, and other information used for producing a new video frame from a past high-quality frame.

A GBM (MCD for AR glasses) predicts the movement of a head that wears VR/AR glasses, and tries to provide a rendered result with a short waiting time. In the case of displaying the content of a cloud or the mutual interaction with a cloud, the location and the direction of the head/eyes and a short-term prediction needs to be transmitted to a cloud having the shortest waiting time. The URLLC is useful for this traffic. Traffic that returns to a device is a rendered result (video frame) or data and metadata for rendering.

3.3.3.3 Fourth Embodiment—Reduce Latency in Teleconference

According to another embodiment of the disclosure, an SS may be replaced with a video presence/conference/virtual reality conference. In this instance, the SSP may control data shared via the URLLC and latency reduction technology.

A strategy for reducing latency in a teleconference and a VR conference:

In the case in which voice streaming has a higher priority than that of video streaming, the URLLC is used to share a voice signal, and a video content, which is difficult to deal with, is shared via the eMBB.

In the case in which both audio-video contents are important and need to reduce latency, the SSS shares metadata so that it is helpful in producing a new video frame from a past frame. This may be a reduced image or converted image to be upscaled via the OnDevice AI.

3.3.3.4 Fifth Embodiment—Vehicle and Safety Improvement

A streaming service (SS) may be one of the edge devices that support a vehicle safety system on a road. A vehicle (a final user) uses the eMBB so as to share data that is used for sharing low-cost content (e.g., a road condition, a vehicle speed, etc.) with another edge device, and may use the URLLC for backing up the eMBB and sending urgent data (fast damage or conflict). In this scenario, the URLLC may provide the most important information with the lowest latency, and the eMBB is in charge of sharing the entire data and context information (e.g., 360-degree view in a vehicle including the entire sensor/LIDAR information).

3.4. Determine Whether the Disclosure is Infringed by Other Inventions

1. In the case of using an own infrastructure, is how a slice is used identified Does a device/SSP request a simultaneous connection of eMBB and URLLC?

2. Does a streaming supplier provide two separate streams via the eMBB and the URLLC?

3. Is a video included in a stream transferred via the eMBB, and does the URLLC transfer some metadata (metadata may be a low-resolution stream)

4. Which effect is given when a network connection is changed? In the case in which a difference is removed, it is identified that the invention is infringed.

5. In the case in which OnDevice AI is accessible, when and how OnDevice AI is used needs to be identified. Is this used when the quality of a connection deteriorates? In this instance, the invention is infringed.

4. The Effect of the Disclosure (the Advantages of this Solution)

4-1 In the case in which the disclosure is implemented, latency of a game streaming service is removed.

4-2 User experience is improved.

4-3 A high-quality content may be produced based on a past frame received via an eMBB stream and metadata received via the URLLC, by utilizing an OnDevice AI module. 4-4. The disclosure needs an innovative access scheme for utilizing a 5G function, and thus may encourage additional research in a 5G slicing area. 4-5 New patent available in a 5G slicing area—additional research is required.

According to various embodiments of the disclosure, a method of operating a streaming service client (SSC) node in a wireless communication system may include an operation of establishing a connection to a streaming service provider (SSP) via two types of services that are enhanced mobile broadband (eMBB) and ultra reliable low latency communication (URLLC), an operation of receiving first data from the SSP via the eMBB, and an operation of simultaneously receiving second data via the URLLC, wherein the second data is metadata of the first data, an operation of determining whether the first data is successfully received, and in the case in which the first data is not successfully received, an operation of producing a data stream using the second data.

According to various embodiments of the disclosure, the operation of identifying whether the first data is successfully received may include an operation of calculating a difference between a timestamp included in the received first data and a current time, and in the case in which the difference exceeds a predetermined threshold value, an operation of determining that the first data is not successfully received.

According to various embodiments of the disclosure, in the case in which the first data starts being received via the eMBB after production of the data stream starts using the second data, the method may further include an operation of producing the data stream using the first data, as opposed to using the second data.

According to various embodiments of the disclosure, the operation of the data stream may include an operation of combining the second data and data that is last successfully received among the first data, and producing the data stream.

According to various embodiments of the disclosure, the second data may include information associated with at least one of image movement between video frames in the first data, enlargement, reduction, or rotation, and the data stream may be produced using the second data based on data last successfully received among the first data.

According to various embodiments of the disclosure, the method may further include an operation of producing a first data stream using the first data, and simultaneously, producing a second data stream using the second data, wherein the first data and the second data include timestamps, and in the case in which, based on the timestamp, the first data is determined as not being successfully received, an operation of performing data processing using the second data stream.

According to various embodiments of the disclosure, the method may further include an operation of producing a first data stream using the first data and performing data processing using the first data stream, in the case in which latency is detected from the first data, a quality of the first data deteriorates, or an error rate of the first data exceeds a threshold error rate, an operation of producing the first data stream using the first data, and simultaneously, producing a second data stream using the second data, wherein the second data includes partial data of the first data that needs to be backed up, an operation of determining to perform slice switch from the first data to the second data, and in the case in which the slice switch is determined to be performed, an operation of performing data processing using the second data stream.

According to various embodiments of the disclosure, the slice switch may be performed by receiving a slice switch indicator from the SSP.

According to various embodiments of the disclosure, a streaming service client (SSC) node in a wireless communication system may include a transceiver, and at least one processor, wherein the at least one processor is configured to establish a connection to a streaming service provider (SSP) via two types of services that are enhanced mobile broadband (eMBB) and ultra reliable low latency (URLLC), to receive first data from the SSP via the eMBB, and simultaneously, to receive second data via the URLLC, wherein the second data is metadata of the first data, to determine whether the first data is successfully received, and in the case in which the first data is not successfully received, to produce a data stream using the second data.

According to various embodiments of the disclosure, the at least one processor may be further configured to calculate the difference between a timestamp included in the received first data and a current time, and in the case in which the difference exceeds a predetermined threshold value, to determine that the first data is not successfully received.

According to various embodiments of the disclosure, the at least one processor may be further configured to produce the data stream using the first data, as opposed to using the second data, in the case in which the first data starts being received via the eMBB after the producing of the data stream using the second data starts.

According to various embodiments of the disclosure, the at least one processor may be further configured to produce the data stream by combining the second data and data that is last successfully received among the first data.

According to various embodiments of the disclosure, the second data may include information associated with at least one of image movement between video frames in the first data, enlargement, reduction, and rotation, and the data stream may be produced using the second data based on the data that is last successfully received among the first data.

According to various embodiments of the disclosure, the at least one processor may be further configured to produce a first data stream using the first data, and simultaneously, to produce a second data stream using the second data, wherein the first data and the second data include timestamps, and to perform data processing using the second data stream in the case in which, based on the timestamp, the first data is determined as not being successfully received.

According to various embodiments of the disclosure, the at least one processor may be further configured to produce a first data stream using the first data, and to perform data processing using the first data stream, in the case in which latency is detected from the first data, a quality of the first data deteriorates, or an error rate of the first data exceeds a threshold error rate, to produce a first data stream using the first data, and simultaneously, to produce a second data stream using the second data, wherein the second data includes partial data of the first data that needs to be backed up, to determine to perform slice switch from the first data to the second data, and in the case in which the slice switch is determined to be performed, to perform data processing using the second data stream.

The methods according to various embodiments of the present disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

The disclosure generally relates to a wireless communication system, and more particularly, to a method and apparatus for reducing the latency of streaming service via network slices that are in parallel in a wireless communication system.

What is claimed is:

1. A method of operating a streaming service client (SSC) node in a wireless communication system, the method comprising:

establishing a connection with a streaming service provider (SSP) node via two types of services including enhanced mobile broadband (eMBB) and ultra reliable low latency communication (URLLC);

receiving, from the SSP node, first data corresponding to a content of a data stream via the eMBB, and second data via the URLLC, wherein the second data is metadata used for generating the content of the data stream when the first data is not able to be used;

identifying whether the first data is successfully received; and in case that the first data is not successfully received from the SSP node, generating the content of the data stream based on the second data, wherein, in case that the first data is successfully received from the SSP node, the first data corresponding to the content is used for a streaming service by the SSC node.

2. The method of claim 1, wherein the identifying of whether the first data is successfully received comprises:

calculating a difference between a timestamp included in the received first data and a current time; and in case that the difference exceeds a predetermined threshold value, determining that the first data is not successfully received.

3. The method of claim 1, further comprising:

identifying that third data is successfully received via the eMBB after the content of the data stream is generated based on the second data; and generating the content of the data stream based on the third data.

4. The method of claim 1, further comprising:

generating the content of the data stream by combining the second data and data that is last successfully received among the first data.

5. The method of claim 1, wherein the second data comprises information associated with at least one of image movement between video frames in the first data, enlargement, reduction, or rotation, and wherein the content of the data stream is generated using the second data based on data last successfully received among the first data.

6. The method of claim 1, further comprising:

identifying a first data stream corresponding to the first data, and a second data stream corresponding to the second data, wherein the first data and the second data include timestamps; and in case that the first data is determined as not being successfully received, performing data processing using the second data stream based on the timestamps.

7. The method of claim 1, further comprising:

in case that latency is detected from the first data, a quality of the first data decreases, or an error rate of the first data exceeds a threshold error rate, determining to perform a network slice switch from an eMBB slice corresponding to the first data to an URLLC slice corresponding to the second data; and in case that the network slice switch is determined to be performed, performing data processing of a second data stream corresponding to the second data.

8. The method of claim 7, wherein the network slice switch is performed by receiving a network slice switch indicator from the SSP node.

9. The method of claim 1, wherein the second data includes at least one of a location of a virtual operator, information used for changing a scene, or information used for generating a new video frame from a past high-quality frame.

10. The method of claim 1, wherein a service of the eMBB is used for transferring a high-quality video content, and a service of the URLLC is used for transferring service-based metadata that is used for generating a missing frame that replaces a standard video stream transferred from the SSP node.

11. A streaming service client (SSC) node in a wireless communication system, the SSC node comprising:
a transceiver;
at least one processor; and
memory storing instructions, when executed by the at least one processor, that cause the SSC node to:
establish a connection with a streaming service provider (SSP) node via two types of services including enhanced mobile broadband (eMBB) and ultra reliable low latency (URLLC),
receive, from the SSP node, first data corresponding to a content of a data stream via the eMBB, and second data via the URLLC, wherein the second data is metadata used for generating the content of the data stream when the first data is not able to be used,
identify whether the first data is successfully received, and
in case that the first data is not successfully received from the SSP node, generate the content of the data stream based on the second data,
wherein, in case that the first data is successfully received from the SSP node, the first data corresponding to the content is used for a streaming service by the SSC node.

12. The SSC node of claim 11, wherein the instructions further cause the SSC node to:
calculate a difference between a timestamp included in the received first data and a current time; and
in case that the difference exceeds a predetermined threshold value, determine that the first data is not successfully received.

13. The SSC node of claim 11, wherein the instructions further cause the SSC node to:
identify that third data is successfully received via the eMBB after the content of the data stream is generated based on the second data; and
generate the content of the data stream based on the third data.

14. The SSC node of claim 11, wherein the instructions further cause the SSC node to:
generate the content of the data stream by combining the second data and data that is last successfully received among the first data.

15. The SSC node of claim 11,
wherein the second data comprises information associated with at least one of image movement between video frames in the first data, enlargement, reduction, and rotation, and
wherein the content of the data stream is generated using the second data based on the data that is last successfully received among the first data.

16. The SSC node of claim 11, wherein the instructions further cause the SSC node to:
identify a first data stream corresponding to the first data, and a second data stream corresponding to the second data, wherein the first data and the second data include timestamps, and
perform data processing using the second data stream based on the timestamps, in case that the first data is determined as not being successfully received.

17. The SSC node of claim 11, wherein the instructions further cause the SSC node to:
in case that latency is detected from the first data, a quality of the first data decreases, or an error rate of the first data exceeds a threshold error rate, determine to perform a network slice switch from an eMBB slice corresponding to the first data to an URLLC slice corresponding to the second data, and
in a case in which the network slice switch is determined to be performed, perform data processing of a second data stream corresponding to the second data.

18. The SSC node of claim 17, wherein the network slice switch is performed by receiving a network slice switch indicator from the SSP node.

19. The SSC node of claim 11, wherein the second data includes at least one of a location of a virtual operator, information used for changing a scene, or information used for generating a new video frame from a past high-quality frame.

20. The SSC node of claim 11, wherein a service of the eMBB is used for transferring a high-quality video content, and a service of the URLLC is used for transferring service-based metadata that is used for generating a missing frame that replaces a standard video stream transferred from the SSP node.

* * * * *